Figure 1:
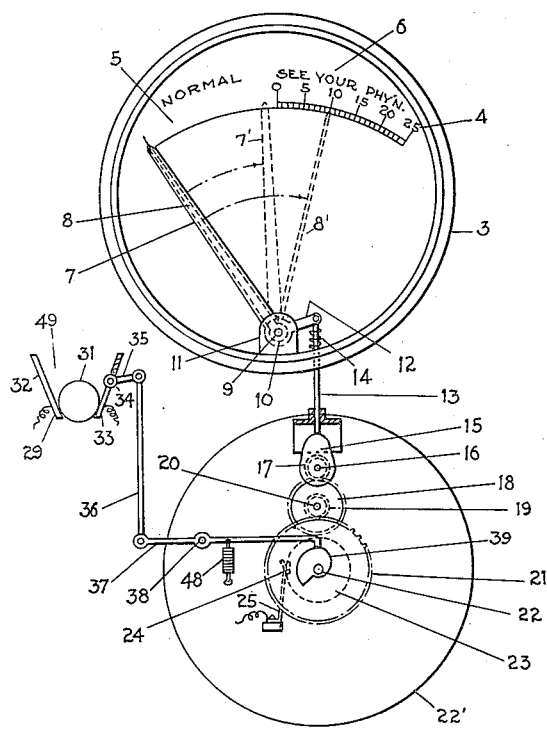

Dec. 11, 1934.     J. P. BUCKLEY     1,983,534
DIAGNOSTIC METHOD AND APPARATUS
Filed July 30, 1932     2 Sheets-Sheet 1

Inventor
John P. Buckley.
John O. Brady
Attorney

Dec. 11, 1934.  J. P. BUCKLEY  1,983,534
DIAGNOSTIC METHOD AND APPARATUS
Filed July 30, 1932  2 Sheets-Sheet 2

Inventor
John P. Buckley.
John B. Brady
Attorney

Patented Dec. 11, 1934

1,983,534

UNITED STATES PATENT OFFICE 1,983,534

DIAGNOSTIC METHOD AND APPARATUS

John P. Buckley, Washington, D. C.

Application July 30, 1932, Serial No. 626,823

6 Claims. (Cl. 128—2)

My invention relates broadly to a diagnostic method and apparatus and more particularly to indicators of the telemetric type.

One of the objects of my invention is to provide a method of diagnosing the condition of the heart by comparing the functioning of the heart with the standard heart beat characteristic in order to inform the patient as to the degree of departure of the heart from normal.

Another object of my invention is to provide a construction of electrical diagnosing apparatus for detecting diseases or abnormal conditions of the heart.

A further object of my invention is to provide means for registering heart beats electrically through a meter having a movable indicator co-acting with a comparator indicator whose movement is predetermined to register the average normal heart beat intended to synchronize with the movement of the electrically operated indicator when registering normal and out of synchronism when the electrically operated indicator registers abnormal.

A still further object of my invention is to provide a scale on the face of a meter, common to two movable indicators, whereby a comparative test may be read, as between an average normal heart beat and one above or below normal which would indicate the degree of certain defects of the heart, such as leaky valve, heart strain and the like.

Still another object of my invention is to afford means whereby such defects of the heart may be portrayed audibly, so as to successively compare with the audible normal heart beat of a prearranged phonographic record, together with explanations, and further, to advise a patient whether or not he or she is in such condition as would require the attention of a physician.

It is of the greatest importance for every person to know whether or not their heart beats are normal. In many cases, a timely warning of early stages of trouble would prove of the greatest benefit by sending the person directly to his physician, which, otherwise and eventually, when left to his own reasoning, might enhance the defect beyond successful treatment. Almost every other person has, at some time or other, some slight heart trouble, which, if not noted, may result in serious proportions.

It is quite true seeing one's physician for examination regularly once a year is excellent advice, but not one in fifty thousand persons will take the trouble to make an effort to see their physician; the expense and personal habits of people do not lead in that particular direction, at least not until the case becomes badly felt, very often too late to be benefited by treatment.

In short, many physicians will say, many cases of heart trouble could be cured if taken in time. The general object of my invention, therefore, is to conveniently place my invention in public places, such as public comfort stations, hospitals, physicians' offices, and the like, where, for a small coin, within a brief interval of time, one may have one's heart scientifically examined, and, if such examination be abnormal, to give the degree of the ailment with advice to see his or her physician.

Figure 7:
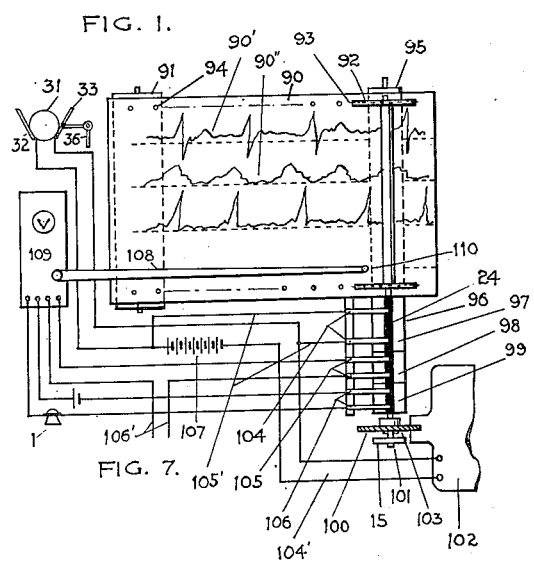
Figure 2:
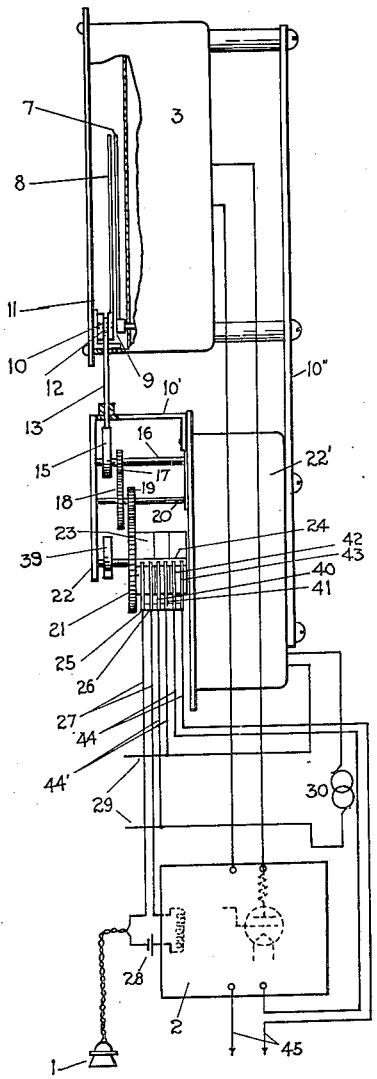
Figure 3:
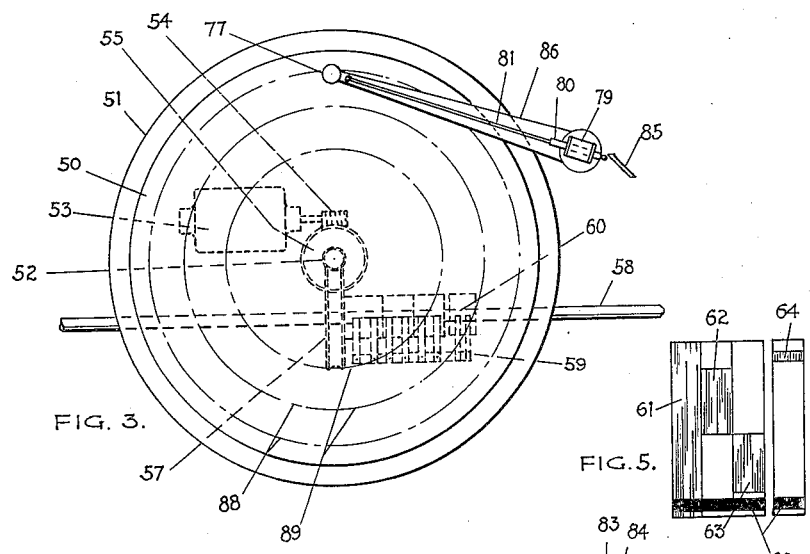
Figure 5:
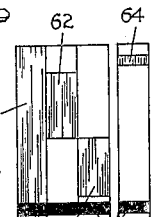
Figure 4:
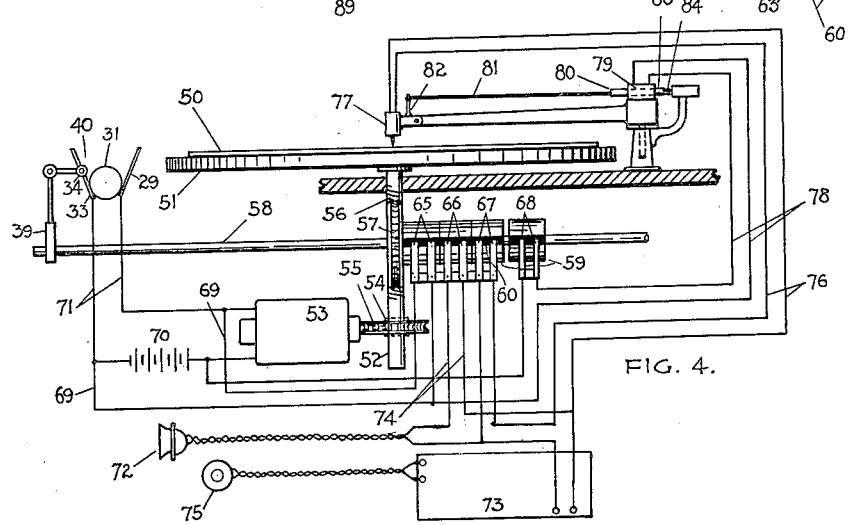
Figure 6:
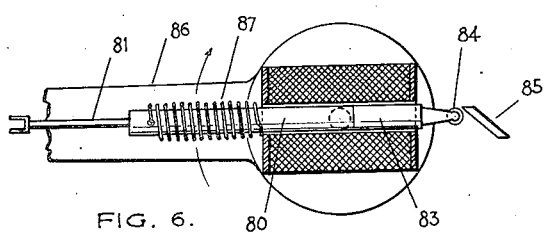

Other and further objects of my invention will be more fully understood from the following description and the accompanying drawings, in which:

Figure 1 is a schematic view illustrating the indicator and comparing scales for the diagnostic apparatus of my invention; Fig. 2 illustrates schematically and diagrammatically the electrical circuits for the diagnostic apparatus and the comparing means for determining differences between the operation of the heart of the patient under test and the normal functioning of the heart; Fig. 3 is a plan view showing the sound emitting apparatus which I may employ for providing an audible test for the patient for indicating differences which may exist between the normal heart beat and the heart beat of the patient; Fig. 4 is an elevational view of the audible test apparatus illustrated in Fig. 3 and showing the testing apparatus in schematic arrangement; Fig. 5 is an enlarged plan view of the comparator which controls the sequence of operation of the parts of the mechanism of my invention; Fig. 6 illustrates an enlarged view of the electromagnetic mechanism for controlling the engagement of the stylus needle with the sound record in the audible test apparatus of my invention; and Fig. 7 is a view of a register which may be employed in the apparatus of my invention for providing a permanent record of the heart beats of the patient as compared to the characteristic of normal heart beats.

I have shown the apparatus of my invention in the form of a portable apparatus which may be installed in public places and operated by the insertion of a coin to give a patient an analysis of his or her heart condition. The insertion of the coin initiates a series of operations enabling the patient who places a microphone adjacent the heart to see the response of an indicator in comparison to the movement of an indicator operating at the normal heart beat frequency. By use of the audible system of my invention, the patient may listen to the beating of the heart in comparison to a normal heart beat. The patient may also be provided with a graph or chart showing the functioning of the heart as diagnosed by the apparatus of my invention as compared with the functioning of a standard heart beat. The apparatus of my invention may be employed with the coin control as an instrumentality auxiliary to equipment now employed in doctors' offices and in hospitals. The coin control feature, however, provides for greatly extended use of the equipment adding much to the welfare of the people.

Referring to the drawings in detail, Fig. 1 shows the microphone 1 electrically connected to an electron tube amplifier 2, whose output actuates the meter 3 in the usual manner. The scale 4 of the meter has division 5, identified as "Normal", and division 6, identified as "See your physician", which is calibrated as shown.

Traversing the scale on the face of the meter are the movable indicators 7 and 8, pivoted independently of each other, as at point 9, the indicator 7 being a part of the meter which is electrically under the control of the microphone and amplifier 2. The auxiliary indicator 8, journaled on projecting stud 10, of angle 11, has a bell crank 12, to which is rockably attached rod 13 downwardly compressed by spring 14, as to engage the cam 15, fixed to arbor 16, also carrying the pinion 17. The gear 18, pinion 19, or shaft 20, forms a part of the gear train meshing with the gear 21, or shaft 22 of motor 22', which shaft also supports the commutator 23, whose periphery carries insulation block 24. The brushes 25 and 26, more clearly shown in Fig. 2, connect with circuit 27 in series with the microphone 1 constituting the microphone circuit.

The circuit 29 is energized through source 30, motor 22' and coin 31 in electrical contact with guides 32 and 33' of a coin control mechanism. One part of the guide represented at 33, is pivoted as at point 34, from which an arm 35 extends, and from which rod 36 depends, rockably connected with arm 37, pivoted as at point 38 and held downwardly compressed on cam 39 by spring 48. The power circuit to the amplifier 2, shown at 45, is controlled through brushes 40 and 41 on commutator 23 as the coin 31 is passed through the mechanism 49 under control of the movement of the cam 39, at which time, the brushes 40 and 41 ride off of the insulation block 24 of the commutator 23. The circuit 29 is closed until the brushes ride on the insulation block completing, as it does, one revolution of the shaft 22. To operate the apparatus, another coin must again electrically bridge the guides 34 and 35.

The circuit 44 leading from brushes 42 and 43 controls the input from the power unit through leads 44'.

Figs. 3 and 5 show the top and side view of a modified form of my invention showing how a comparative heart test may be brought about by the application of a phonograph, whose record may impart to the listener the several defects most prevalent through the telephone 72, after which the same person may be advised to hold the microphone to his heart, and, after studying his own heart action compare such study with the defective forms of heart beats so recorded on the record. The record may also contain advice or other information pertinent to the test before shutting down.

The audible equipment consists essentially of a record 50, revolvably supported by table 51, having a spindle 52, and made to revolve by motor 53, through worm gears 54, and 55 meshing with the threaded portion 56 of the spindle 52 through gear 57 fixed to shaft 58. Adjacent thereto and revolvable therewith is insulated drum 59, carrying insulation strip 60 and metallic blocks 61, 62, 63 and 64 as shown in Fig. 5. Electrically contacting therewith are brushes 65, 66, 67 and 68. The brushes 65, through wires 69, and source 70, control the motor 53, after the coin circuit, through wires 71, has been broken by the release of the coin. This circuit remains open until after one revolution of the shaft when the brushes 65, will again ride upon insulation strip 60.

The brushes 66 electrically control the microphone 72 of the amplifier 73 through wires 74' when electrically contacting with the metallic block 62, while brushes 67 control the connection of the telephone 75 through wires 76 electrically contacting with metallic block 63 and pick-up unit 77 and the output of the amplifier 73.

The brushes 68, when electrically contacting with metallic block 64, through wires 78 and source 70, control the electromagnet 79, having an armature 80, to which is attached rod 81, the outer end of which is pivotally attached to the arm 82 of the phonograph stylus or pick-up 77 rockably mounted on the arm 81 as shown in Fig. 6. The rear end of the brass portion 83 of the armature supports a roller 84 to angularly engage the fixed cam 85 when the magnet is energized, for the purpose of returning the arm 86 to its normal position to become operative again when another coin is dropped into the coin slot. It is noted that the rod 81 releases the stylus from the record before the roller contacts with the cam. The spring 87, surrounding the armature serves to keep the armature forward, normally, thereby allowing the stylus to rest on the record.

Fig. 7 represents another modified form of my invention in which I employ a tape bearing graphs of heart beats depicting the common ailments of the heart 90' and 90'', together with a graph of a normal heart beat 91'. The bottom space 91'' is reserved for the test curves of the heart of the patient under test. Numeral 91 shows a spool around which the tape is housed and from which it is unwound by sprocket wheel 92 having teeth 93 in mesh with the apertures 94 of the tape. The roller 95 serves to guide the tape. Reference character 96 indicates a commutator supported on and extending from the sprocket shaft 101 having three insulated segments 97, 98 and 99 and peripherally supporting the insulation block 24 and fixed thereon is gear 103 of motor 102. The cam 15 operates the rod 36 of coin control 32 and 33. The brushes 104 control the coin circuit 104' and is later short-circuited by coins 105' when the metallic portion, segment 97, moves under the brushes. The input circuit is represented by numeral 106' and is controlled by brushes 105 while the microphone circuit is controlled by brushes 106.

Reference character 110 indicates a pen on arm 108 controlled by the electrically operated cardiograph 109 of any suitable type. The curve drawn by the pen 110 will indicate to the patient the condition of the heart, for many of the irregularities of the heart which are experienced, among which are sinus arhythmia, heart block, premature contractions, simple paroxysmal tachycardia, auricular flutter, auricular fibrillation and alternation of the pulse.

The movable chart apparatus is operated by coin control so the patient may receive an accurate account of his or her heart condition by the payment of a small coin. The apparatus of my invention is highly practical and provides means for prolonging life by informing the patient as to his actual condition within time to permit the patient to receive proper treatment.

While I have described my invention in certain preferred embodiments, I desire that it be understood that modifications may be made and that no limitations upon my invention are intended other than are imposed by the scope of the appended claims.

What I claim as new and desire to secure by Letters Patent of the United States is as follows:

1. Diagnostic apparatus comprising an indicator having an arcuate shaped scale divided into two portions, a pair of indicators pivotally mounted adjacent each other on one side of said scale and operative thereover, means for imparting oscillatory movement to one of said indicators over one portion of said scale at a rate determined by the normal average heart beats, and means actuated by the heart beats of a patient for oscillating the other of said indicators with respect to both portions of said scale whereby the degree of departure of the functioning of the patient's heart from normal may be detected.

2. Diagnostic apparatus comprising rotary driving mechanism, means for initiating said rotary driving mechanism into motion, an indicating instrument including a scale and a pair of independent indicators movable with respect thereto, means for imparting oscillatory movement to one of said indicators from said mechanism at a frequency simulating the frequency of operation of the normal average heart, and means for imparting oscillatory movement to the other of said indicators at a frequency dependent upon the functioning of the heart of a patient under observation for comparing the operation of said indicators with respect to said scale and determining the condition of the heart of the patient under observation.

3. Diagnostic apparatus comprising a driving mechanism, means for initiating said driving mechanism in motion, a phonograph actuated by said driving mechanism, said phonograph having a sound record of the normal average heart beat, means for reproducing from said phonograph an audible indication of the normal average heart beat, and a microphone and sound reproducer circuit for reproducing the heart beat of a patient for direct comparison with the audible normal average heart beat record on said phonograph for determining the condition of the heart of the patient.

4. Diagnostic apparatus comprising a measuring instrument having a graduated scale thereon, a pair of indicators movable over said scale, mechanical means for oscillating one of said indicators at a rate determined by the normal average heart beat, and electrical means for oscillating the other of said indicators at a rate determined by the beating of the heart of a patient for comparing the movements of the two indicators with respect to said graduated scale.

5. Diagnostic apparatus comprising a measuring instrument including a graduated scale and a pair of indicators movable thereover, electrical means for oscillating one of said indicators, mechanical means for oscillating the other of said indicators, means for governing the operation of said mechanical means in accordance with the normal average heart beat, and means for governing the operation of said electrical means in accordance with the heart beat of a patient under observation for comparing the amplitude of oscillations of said indicators on said scale.

6. Diagnostic apparatus comprising a measuring instrument including a graduated scale and a pair of indicators movable thereover, electrical means for oscillating one of said indicators, a preformed cam device, means for driving said cam device for imparting oscillatory motion to one of said indicators in accordance with the average normal heart beat, electrical means for imparting oscillatory motion to the other of said indicators, and means controlling the operation of said electrical means in accordance with the heart beat of a patient under observation for effecting a comparison in the oscillatory movement of said indicators with respect to said scale.

JOHN P. BUCKLEY.